(12) United States Patent
Baszucki

(10) Patent No.: US 8,277,318 B2
(45) Date of Patent: Oct. 2, 2012

(54) SYSTEM FOR CREATING AND OPERATING THREE-DIMENSIONAL VEHICLES FROM PRE-CONSTRUCTED PARTS

(75) Inventor: David Baszucki, Portola Valley, CA (US)

(73) Assignee: Roblox Corporation, San Mateo, CA (US)

( * ) Notice: Subject to any disclaimer, the term of this patent is extended or adjusted under 35 U.S.C. 154(b) by 78 days.

(21) Appl. No.: 12/949,041

(22) Filed: Nov. 18, 2010

(65) Prior Publication Data

US 2012/0129597 A1    May 24, 2012

(51) Int. Cl.
 *G06F 17/00* (2006.01)
(52) U.S. Cl. .......................................................... 463/31
(58) Field of Classification Search .............. 463/33–40, 463/42
See application file for complete search history.

(56) References Cited

U.S. PATENT DOCUMENTS

| | | | |
|---|---|---|---|
| 2005/0080606 A1* | 4/2005 | Ampunan et al. | 703/8 |
| 2006/0017654 A1* | 1/2006 | Romo | 345/7 |
| 2009/0093300 A1* | 4/2009 | Lutnick et al. | 463/26 |
| 2010/0056273 A1* | 3/2010 | Reville et al. | 463/31 |
| 2010/0124967 A1* | 5/2010 | Lutnick et al. | 463/17 |
| 2010/0227682 A1* | 9/2010 | Reville et al. | 463/29 |

* cited by examiner

*Primary Examiner* — Ronald Laneau
(74) *Attorney, Agent, or Firm* — Donald R. Boys; Central Coast Patent Agency, Inc.

(57) ABSTRACT

A game system involves software executing from a machine-readable physical medium on a computerized appliance, an interactive interface provided by the software and accessible to a client, enabling the client to participate in a video game incorporating an avatar associated with the client, a jumbled association of parts of a specific vehicle represented in a scene in the video game, and one or more trigger devices available to the client, individual trigger devices associated with different specific vehicles. Applying a trigger device from the one or more devices to the association of parts, if the device is associated with that specific vehicle, causes the parts to rearrange in the interactive interface into a recognizable vehicle operable by the avatar manipulated by the client.

20 Claims, 5 Drawing Sheets

SYSTEM FOR CREATING AND OPERATING THREE-DIMENSIONAL VEHICLES FROM PRE-CONSTRUCTED PARTS

BACKGROUND OF THE INVENTION

1. Field of the Invention

The present invention is in the field of object modeling and pertains particularly to methods and apparatus for creating and activating a three-dimensional vehicle in a three-dimensional game or virtual world.

2. Discussion of the State of the Art

Object modeling is a process whereby a real or envisioned object that may be a three-dimensional object is represented by a virtual object which is electronically created and in some cases physically simulated when in use to demonstrate motion and other forces that might be acting on the object or that may be part of the available properties of the object.

In the gaming world, three-dimensional worlds include any variety of objects that might be created in some instances and then used in play of the game the object is created for. In many cases players are allowed to create certain objects for game play and may, in some instances be compensated for the sale of and use of such objects that were created by them and therefore owned by them.

Object creation is typically a process that requires some coding and or scripting capability of the user as opposed to object assembly, which is a process of assembling an object from pre-constructed components that are readily available to the user. In the process of object assembly where pre-constructed components are provided, the objects are typically very simple and straight forward like a brick wall assembled of bricks by stacking the bricks together to build the wall.

More complicated objects such as vehicles are much more difficult to build and require physics simulation and control interfaces to operate. In some virtual worlds it may be advantageous to a player to be able to quickly build and activate a vehicle during game time. Vehicles may have certain advantages over other virtual objects in that a player may access parts of the world that otherwise might be off limits to the player. An example might be building a submarine to travel beneath a body of water or an airplane to fly in the sky. Challenges with creating more complex objects like vehicles that require physics simulation to operate may include time delay (long time to build), object control issues such as which keys of the keyboard can be used to operate the object, and whether vehicle parts and available knowledge as to how to put the parts together can be easily and quickly accessed.

Therefore, what is clearly needed is a system for enabling a user to quickly create and operate a three-dimensional virtual vehicle from pre-constructed parts specific or non-specific to the particular vehicle type.

SUMMARY OF THE INVENTION

The problem stated above is that ease of creation of a three-dimensional game vehicle is desirable for an object builder working within a three-dimensional game environment, but many of the conventional means for constructing three-dimensional vehicles for a three-dimensional game, such as by coding and or scripting, also create more potential for error, complexity, and time delays. The inventors therefore considered functional components of a gaming system, looking for elements that exhibited suitable object characteristics that could potentially be harnessed to provide a three-dimensional vehicle creation process for a three-dimensional gaming system but in a manner that would not create additional work, complexity, or time delays.

Every three-dimensional vehicle has a method of locomotion and a station for operation, one by-product of which is singular application according to vehicle type and capabilities. Most such three-dimensional vehicles employ a seat for a vehicle operating station and wheels, axels and similar components to facilitate vehicle locomotion, and seats, wheels, axels, and other parts are typically a part of vehicle apparatus.

The present inventor realized in an inventive moment that if, at the point of need, a three-dimensional vehicle could be created automatically or semi-automatically from an existing group of available parts, significant reduction in coding and manual processing might result. The inventor therefore conceived a unique system for three-dimensional games that allowed three-dimensional vehicles to be created automatically or semi-automatically during game runtime without requiring scripting or coding. A significant reduction is work results, with no impediment to game play or simulation capacity created.

Accordingly, in an embodiment of the present invention a game system is provided, comprising software executing from a machine-readable physical medium on a computerized appliance, an interactive interface provided by the software and accessible to a client, enabling the client to participate in a video game incorporating an avatar associated with the client, a jumbled association of parts of a specific vehicle represented in a scene in the video game, and one or more trigger devices available to the client, individual trigger devices associated with different specific vehicles. Applying a trigger device from the one or more devices to the association of parts, if the device is associated with that specific vehicle, causes the parts to rearrange in the interactive interface into a recognizable vehicle operable by the avatar manipulated by the client.

In one embodiment the software executes on a server connected to the Internet network, and the client accesses the interactive interface from a second computerized alliance also connected to the Internet network. Also in one embodiment the trigger device is a specific command provided by the client through an input mechanism. In a different embodiment the trigger device is a token displayed in the scene and movable by the client by manipulating the avatar.

In some embodiments the scene includes landscape elements, and a type of specific vehicle for an association of parts may be suggested by a type of landscape element proximate the association of parts. The landscape element may be a body of water, and the specific vehicle a boat. Specific vehicles may also be one of a boat, a hovercraft, an airplane, an automobile, a truck, a motorcycle, a bicycle, a scooter, a unicycle, a train, or an animal that may be mounted and ridden.

In some embodiments the token is an identifiable part associated with the specific type of vehicle of the association of parts, and may be, for example, a seat for the vehicle. IN some embodiments the rearrangement of parts into a recognizable vehicle is accompanied by a display of instructions for operating the vehicle.

In another aspect of the invention a method for providing a vehicle for an avatar in a game system is provided, the method comprising the steps of (a) presenting to a client in a scene of a video game in an interactive interface provided by software executing from a machine-readable physical medium on a computerized appliance, a jumbled association of parts of a specific vehicle, the interactive interface enabling the client to manipulate an avatar associated with the client; (b) initiating by the client a trigger device, from a plurality of trigger devices each associated with a different specific vehicle; and (c) causing, by the initiation of the trigger device, the association of parts to resolve in the scene into a recognizable vehicle operable by the client through the avatar.

In one embodiment of the method the software executes on a server connected to the Internet network, and the client accesses the interactive interface from a second computerized alliance also connected to the Internet network. Also in one embodiment the trigger device is a specific command provided by the client through an input mechanism. In another embodiment the trigger device is a token displayed in the scene and movable by the client by manipulating the avatar.

In some embodiments the scene includes landscape elements, and a type of specific vehicle for an association of parts may be suggested by a type of landscape element proximate the association of parts. IN one example the landscape element is a body of water, and the specific vehicle is a boat. The specific vehicle may be a boat, a hovercraft, an airplane, an automobile, a truck, a motorcycle, a bicycle, a scooter, a unicycle, a train, or an animal that may be mounted and ridden. The token also may be an identifiable part associated with the specific type of vehicle of the association of parts.

In some cases the identifiable part is a seat for the vehicle. Also in many embodiments the rearrangement of parts into a recognizable vehicle is accompanied by a display of instructions for operating the vehicle.

BRIEF DESCRIPTION OF THE DRAWING FIGURES

DETAILED DESCRIPTION

The inventors provide a unique gaming subsystem for facilitating construction and operation of a three-dimensional vehicle from a set of pre-constructed parts. The methods and apparatus of the present invention are described in enabling detail using the following examples, which may represent more than one embodiment of the present invention.

Figure 1:
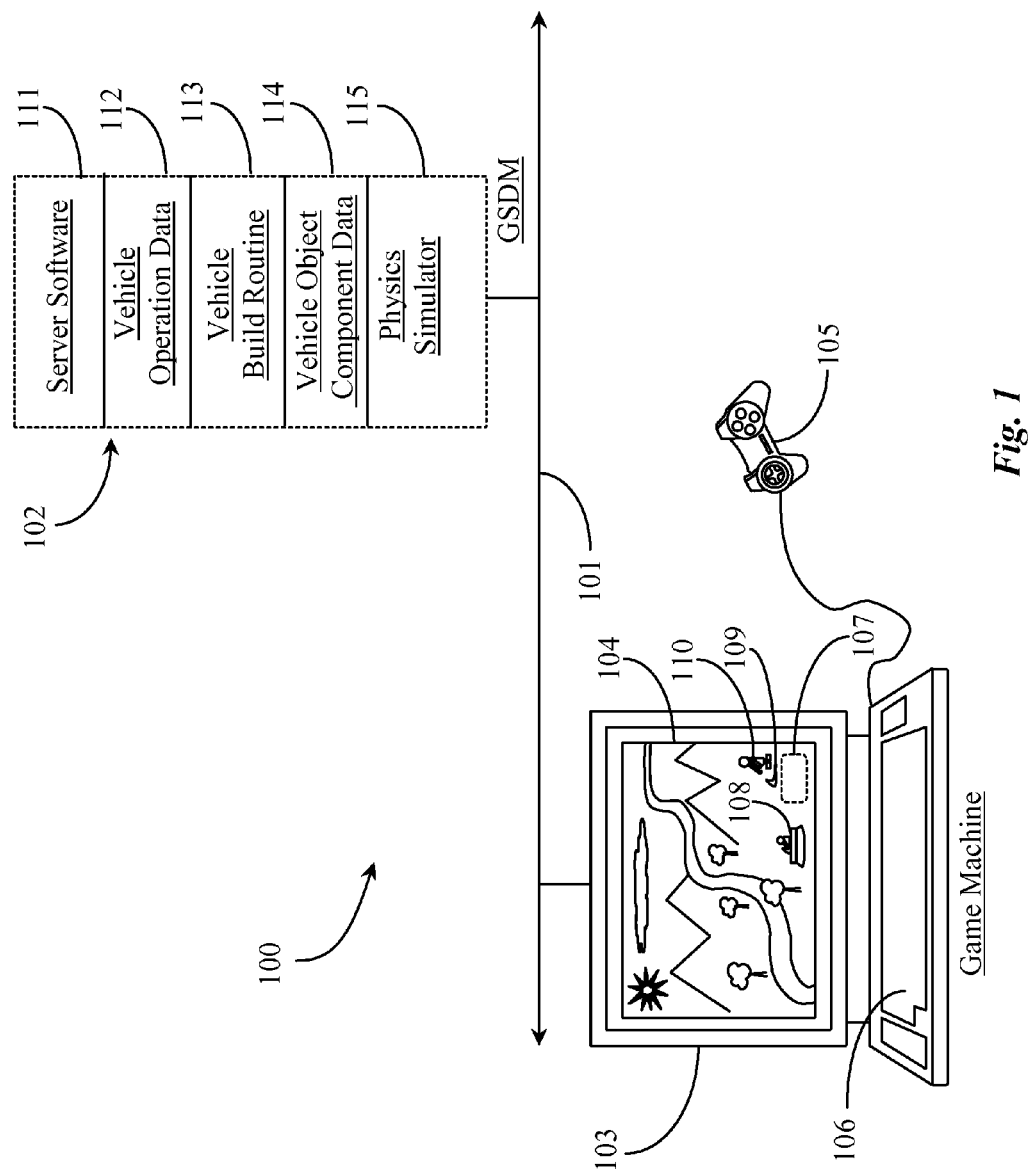
FIG. 1 is an architectural view of a gaming network that enables vehicle build operations according to an embodiment of the present invention.

FIG. 1 is an architectural view of a gaming environment 100 that enables vehicle build operations according to an embodiment of the present invention. Gaming network 100 is a logical representation of a gaming machine 103 accessing a game server 102 connected to a digital network 101. Digital network 101 is, in one embodiment, the well-known Internet network. In this aspect, element 101 represents all of the lines, equipment, and access points that make up the internet network as a whole including any connected sub-networks. Therefore, there are no geographic limitations to the practice of the present invention. Practice of the present invention is not limited to the Internet network. Network 101 may be a corporate wide area network (WAN) or a local area network (LAN) without departing from the spirit and scope of the present invention.

Gaming server 102 has a digital medium accessible that contains all of the software 111 and data required to enable function as a game server. A gaming machine 103 is illustrated in this example as connected to Internet backbone 101. Gaming machine 103 may be a multi-task computer, a dedicated gaming box, or another computing appliance able to connect online and access game server 102.

Gaming machine 103 has connection to Internet backbone 101 by any of several known Internet connection methods. For example, known connection schemes include broadband, digital service line (DSL), cable/modem, dial-up through Internet Service Provider (ISP), and so on. In a preferred example, gaming machine 103 has a high speed connection to gaming server 102. Gaming server 102 is adapted to serve three-dimensional games on demand to clients of a gaming Website (not illustrated). When a client selects a game to play, he or she is redirected to the gaming server for game play.

Gaming machine 103 is engaged in game play and a virtual world scene 104 is in display on the machine monitor. Scene 104 may be assumed to be dynamic and moving as would be the case of engaging a three-dimensional active virtual world. A game player is illustrated in this example by an avatar 110. Avatar 110 may be controlled by keys on keyboard 106 or by a game controller 105 connected to machine 103 by serial or ultra fast universal serial bus (USB) cable.

Gaming server 102 includes a physics simulator 115 adapted to physically simulate motion and force exerted during game play by game players. In this example, the virtual world 104 allows game players represented by avatars such as avatar 110 to initiate construction of a vehicle from a collection of three dimensional parts resembling a parts pile 107. In one embodiment of the present invention the parts in parts pile 107 are not particularly distinguishable by eye to a specific type of vehicle. The pile may resemble a pile of bricks or blocks for example. In another embodiment collections of vehicle parts may be visually identifiable to a game player as to what type of vehicle they might belong to.

For purposes of discussion a vehicle may include any type of operable assembly of parts that can provide some type of locomotion for the player (represented by avatar) controlling the vehicle. Examples of vehicle types include but are not limited to cars, trucks, planes, boats, hovercrafts, motorcycles, tri-cycles, bicycles, or any other conceivable vehicle type that might be created and provided in a virtual world. A vehicle may, in some embodiments, represent an animal assembled from block or anatomic animal parts. A vehicle may, in some embodiments, be a mechanical contraption that when assembled does not really resemble a typical vehicle, rather some type of mechanical apparatus that has a seat and a means of locomotion such as one or more wheels or appendages that are physically simulated to move the vehicle body.

In this example, avatar 110 has a vehicle seat 109, which the avatar places on parts pile 107 to initiate a build sequence for a vehicle. In a case where parts pile 107 comprises indistinguishable parts, seat 109 may contain the active properties including parts list for the vehicle type such that the correct parts identified in the seat properties are retrieved and assembled. In this case, avatar 110 places seat 109 onto parts pile 107 to create hovercraft 108 for traveling on the river in the virtual world scene 104.

An algorithm (described later in this specification) enables automated vehicle assembly which is a process that may occur in real time during game play or may be practiced outside the game to supply one or more vehicles for the game. A vehicle seat, for example, may associate with vehicle properties and parts data, where identification is made of actual parts in a parts pile activating the algorithm to facilitate creation of the specific type of vehicle according to the included vehicle properties known to the seat. For example, parts in pile 107 may belong to hovercraft 108. When seat 109 is associated with the parts pile, the seat recognizes the parts as being hovercraft parts and activates the algorithm to build a hovercraft from the parts.

In another embodiment there are a variety of different seats available for creating vehicles from parts collections or representations thereof. In this case a seat may include properties of a single vehicle type the seat is designed for. A seat for an airplane would invoke building of an airplane when associated with a pile of parts that may or may not be recognizable to a player observing screen 104 as airplane parts. In another embodiment of the present invention, a player simply issues a "make vehicle" command after selecting a pile of vehicle parts or associates a "make vehicle" token with a pile or collection of vehicle parts.

It is noted that in this embodiment all vehicles being created in real time during game play are known to the system before real-time assembly and can be associated with logic that enables a complete build of the vehicle. That is to say that the same vehicle has been assembled, tested, and disassembled at least once in association with the virtual world. Therefore all of the vehicle parts and joints are cataloged, have part numbers or identifications, and are immediately available to the game server.

Game server 102 includes vehicle operational data 112, such as throttle and steering instructions on the digital medium accessible to the server. Vehicle operational data 112 may include operation instructions such as key press information (Alt key, space bar, etc.) or controller data for correct operation of all vehicles available to the system. Vehicle operational data 112 also includes the operating instructions for any pre-assembled vehicles that are ready to drive when encountered in the virtual world. Game server 102 has a vehicle build routine 113 resident on the digital medium and adapted for building a vehicle in the abstract sense.

The actual build steps and sub-steps associated with the basic algorithm may vary according to actual vehicle type and specific build specifications. Game server 102 includes all of the vehicle object component data 114 for all of the vehicles that can be assembled in the virtual world. The vehicle object component data includes all of the parts, the descriptions of the parts, the joints for attaching the parts together and so on for all of the build components of any vehicle known to the system.

In game play, a vehicle that can be assembled from a pile of parts may be strategically placed in a virtual world scene as a pile of vehicle parts adjacent to some type of terrain or medium that requires a vehicle of that type to traverse. For example, a pile of submarine parts may be placed next to an oceanic trench. A pile of helicopter parts might be located at the bottom of a cliff. A vehicle may be an animal in some embodiments. A seat for an animal might be a saddle for a horse or for a camel, for example. Therefore, a pile of camel parts might be located next to a bunch of treacherous sand dunes, perhaps adjacent to another pile of parts representative of a dune buggy. There are many different configurations that are possible.

In this example avatar 110 places seat 109 onto parts pile 107 to initiate a build process to create hovercraft 108. Hovercraft 108 is a vehicle that can be used to traverse the river and adjacent ground in virtual world scene 104. Game server 102 may generate and send a display containing the appropriate vehicle operation keys, bars, or controls (controller) for operating the throttle (if any) and for steering the vehicle. These controls may be embodied in particular key presses on keyboard 106 (computer) or as specific buttons on game controller 105. Physics simulator 115 simulates vehicle operation according to established instruction. Operating a hovercraft may require different keys or buttons than operating a car or a submarine, for example. The exact operating instructions displayed for a user depend entirely on the type of vehicle that is activated from the parts pile. In one embodiment of the present invention there are random pre-assembled vehicles placed in the virtual world such as world 104 and an avatar simply places a seat on the vehicle to activate the vehicle for travel.

It is not required that the vehicles be assembled from pre-constructed parts during game play in order to practice the present invention. In one embodiment a vehicle or vehicles can be pre-assembled from pre-constructed parts before game play using an object modeling application such that a completely functional vehicle can be assembled and made available to a game or virtual world such as for purchase, etc. The vehicle then could be introduced into the virtual world as a pre-assembled vehicle that just requires activation by an avatar in order to operate the vehicle in the game or virtual world.

Figure 2:
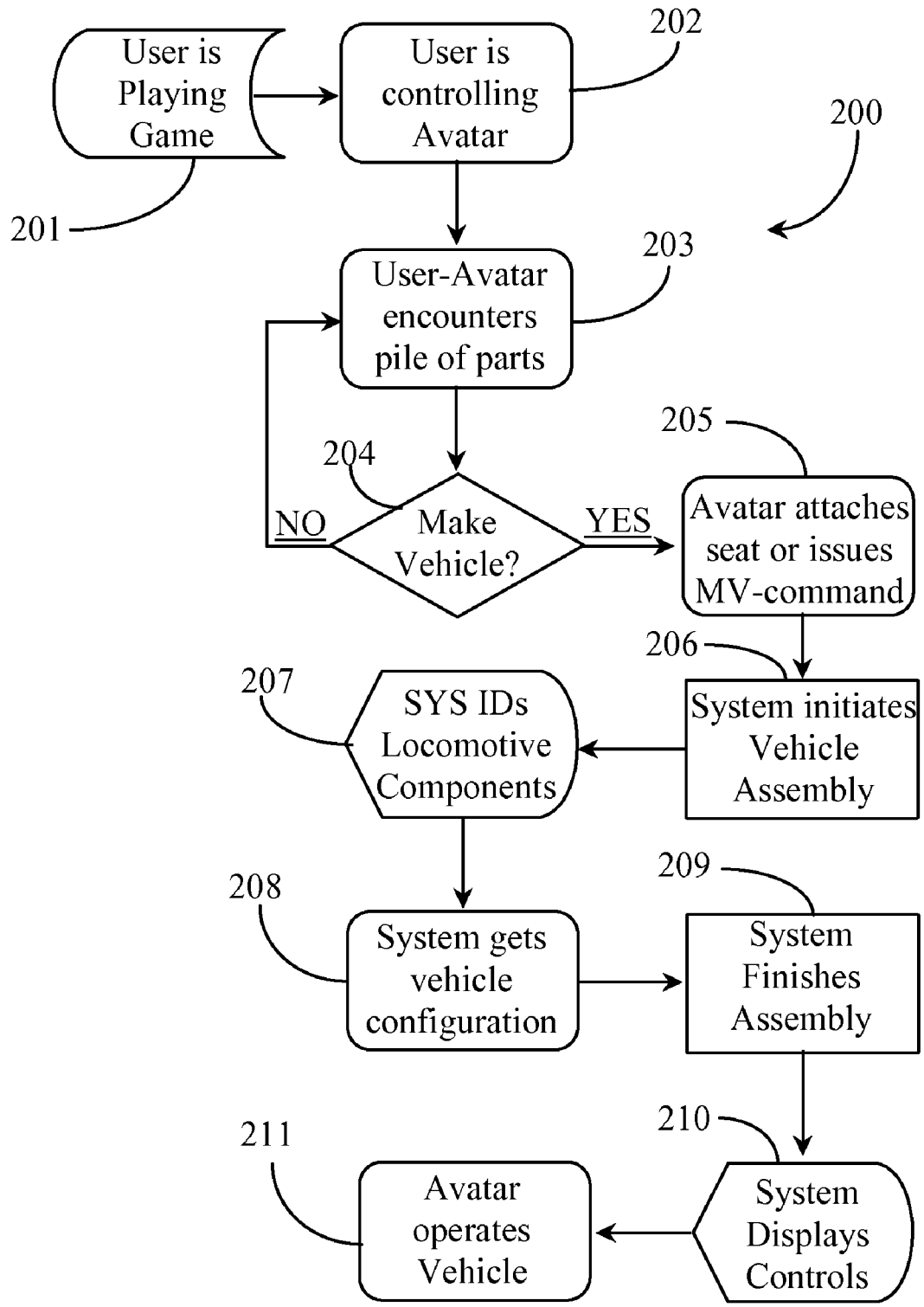
FIG. 2 is a process flow chart illustrating basic steps for building and operating a three-dimensional vehicle according to an embodiment of the present invention.

FIG. 2 is a process flow chart 200 illustrating basic steps for building and operating a three-dimensional vehicle according to an embodiment of the present invention. At step 201 a user is online and playing a virtual game or otherwise engaging in a virtual world such as world 104 of FIG. 1. At step 202 the user of player is in control of an avatar (game piece representing the player).

At step 203 the avatar encounters a pile of vehicle parts. At step 204 the user may make a decision whether or not to make a vehicle from the encountered parts pile. If the user decides not to make a vehicle from the parts pile encountered, the process may loop back to step 203 where the avatar encounters another parts pile and thus is prompted again to decide whether or not to make a vehicle at step 203. If the avatar decides to make a vehicle from the pre-constructed parts, the avatar adds a vehicle seat to the parts pile or issues a make vehicle (MV) command to initiate the process of building the vehicle. In step 205 the avatar may also add a make-vehicle "token" to the parts pile.

In one embodiment the make vehicle token, like a seat in other embodiments, has all of the properties associated with a specific vehicle type. That is to say that the avatar may be in possession of one or more "make vehicle" tokens, each one for a different vehicle that may be encountered in the virtual world. So if the avatar encounters a pile of vehicle parts the avatar may then determine from the tokens in possession which token and thus which type of vehicle the avatar will build for a specific scenario. For example, if the avatar has to cross a vast mud field, and has a token for a four-by-four truck and a token for a motorcycle, the avatar might flip the token for the four-by-four truck onto the parts pile to initiate construction of the truck.

At step 206 the system initiates vehicle assembly. In one aspect of the process, the system identifies locomotive components that are mixed in with the grouping of vehicle parts at step 207. For example, the system may look for parts that could be used as wheels, axels, rotational joints, movable appendages, and may determine a suitable vehicle configuration from the parts identified. At step 208 the system may get or retrieve the vehicle configuration (build instructions) known to the system for the identified parts. The system may finish or complete the assembly of the vehicle at step 209.

Once the vehicle is built, the system may display vehicle operation controls at step 210. In this step a display window or information bar may appear on the monitor of the user's gaming machine that tells the user how to operate the vehicle such as what keys to press to apply forward movement, steering, braking, and any other control properties of the vehicle. For example, if the vehicle were a plane the control properties would include which keys to press to provide propeller thrust and lift, as well as braking and bank turning. The avatar may begin operating the vehicle at step 211.

Figure 3:
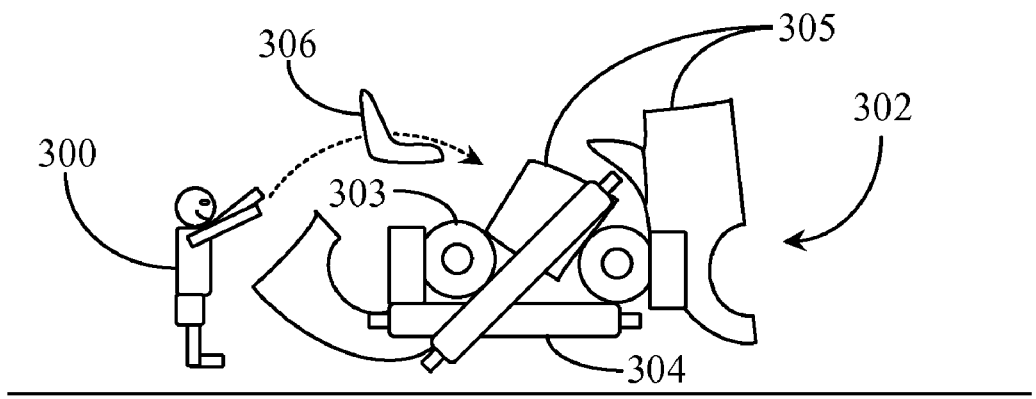
FIG. 3 is an elevation view of a pile of vehicle parts activated for build by a vehicle seat.

FIG. 3 is an elevation view of a pile 302 of vehicle parts activated for build by a vehicle seat. Parts pile 302 represents individual parts of a vehicle jumbled together as a pile that might be encountered during play of a three-dimensional game or while engaging a virtual world. Pile 300 includes two sets of wheels 303 (four wheels total). A pair of axels 304 is present in pile 302. Chassis parts 305 include a front chassis, a rear chassis, and a door. In this example all of the vehicle parts are visible and identifiable. Avatar 300 has access to vehicle seat 306. Vehicle seat 306 may be a part that is loosely associated with parts 302. In one embodiment seat 306 is part of an arsenal of vehicle seats that a user may have access to for the purpose of activating various vehicles in the virtual world. In this example, seat 306 is used to initiate an automated assembly routine known to the system for assembling parts 302 into an operable vehicle.

Figure 4:
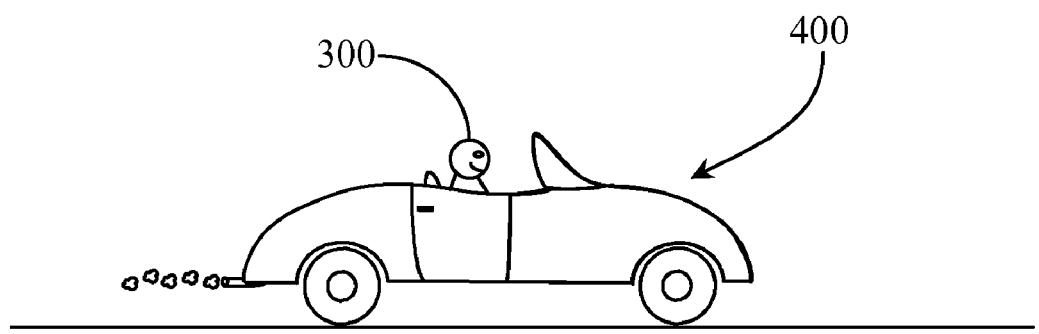
FIG. 4 is an elevation view of a finished vehicle created from the parts of FIG. 3.

FIG. 4 is an elevation view of a finished vehicle 400 created from parts pile 302 of FIG. 3. After vehicle assembly of the parts pile of FIG. 3 is completed, avatar 300 may operate the vehicle according to operating instructions that might be displayed in a window or pop-up screen. Vehicle 400 is an automobile in this example. Many other types of vehicles including animals that might serve as a vehicle, such as a horse or a camel might be associated with a particular seat used to activate assembly of the vehicle. In one embodiment instead of using a seat to initiate vehicle assembly, a make vehicle command or a vehicle assembly token might be provided.

Figure 5:
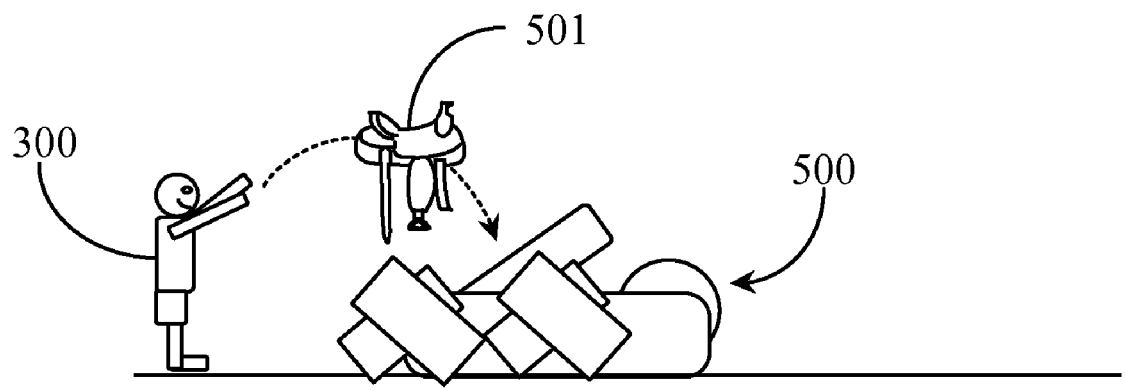
FIG. 5 is an elevation view of a pile of parts activated by a saddle to build a horse.

FIG. 5 is an elevation view of a pile of parts 500 activated by a saddle to build a horse. Parts pile 500 represent parts that are not identifiable by sight so that one would be able to determine a vehicle type by simply looking at the parts. Parts pile 500 represents a parts pile of any type of vehicle that avatar 300 might have a seat for. In this example avatar 300 makes a decision as to what type of available vehicle would be instantly useful under current virtual world or game conditions. Avatar 300 then initiates assembly of that vehicle by adding a particular type of seat to the unidentifiable parts pile. In this case parts pile 500 may represent any vehicle known to the system.

Seat 501 is a saddle in this example. Avatar 300 has decided that a horse would serve best for travel through a specific terrain encountered in the virtual world. The properties of saddle 501 include identification of a horse and all of the parts for assembling the horse and the build configuration for the horse. In this case as in the previous example of FIGS. 3 and 4, avatar 300 attaches saddle 501 to parts pile 500 to initiate automated assembly of a horse.

Figure 6:
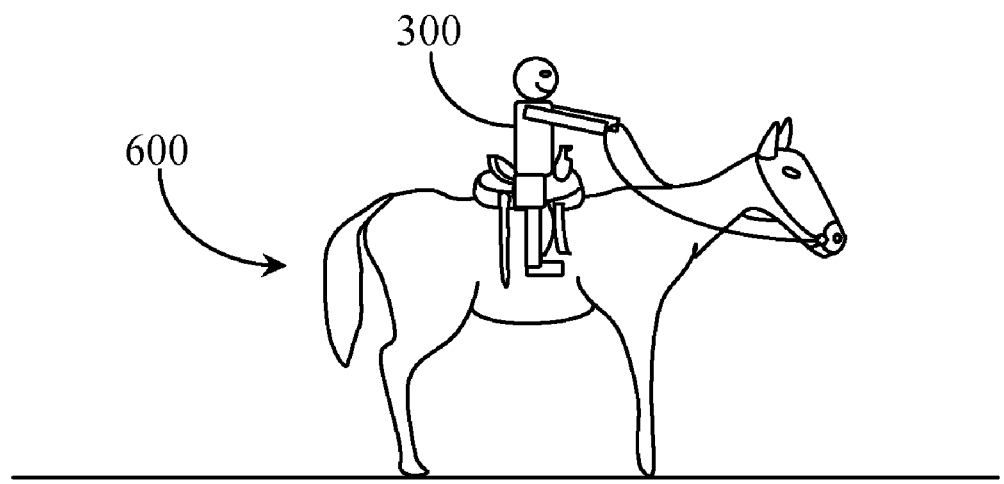
FIG. 6 is an elevation view of a horse built with parts of FIG. 4.

FIG. 6 is an elevation view of a horse 600 built with parts from parts pile 500 of FIG. 4. Horse 600 is illustrated as a realistic version that includes life like shape and profile of a typical horse. In another embodiment horse 600 may be a block horse made from block type parts or building blocks. Avatar 300 is riding atop horse 600 in the saddle used to assemble the horse. Saddle 501 may also include the properties defining the locomotion of horse such as walk, trot, gallop, jump, left rein, right rein (steering), etc. After assembling horse 600, the system may cause automated display of operation instructions such as identification of keyboard keys and or controls enabling avatar 300 to ride the horse successfully.

In one embodiment an avatar that assembles and begins operation of a vehicle may operate the vehicle until it is no longer needed. The avatar may then abandon the vehicle and it may revert back to the state it was originally encountered such as a pile of parts. In one embodiment a user may build and test a new vehicle and then make that vehicle available to new users through a virtual world or game. In one embodiment vehicles are pre-assembled but not operable without a vehicle seat, which may be used to activate the vehicle for operation. It may be noted herein that a basic algorithm for building a vehicle may function to build and enable operation of any type of vehicle as long as the parts properties, joint properties, and operational instructions are known to the system.

Figure 7:
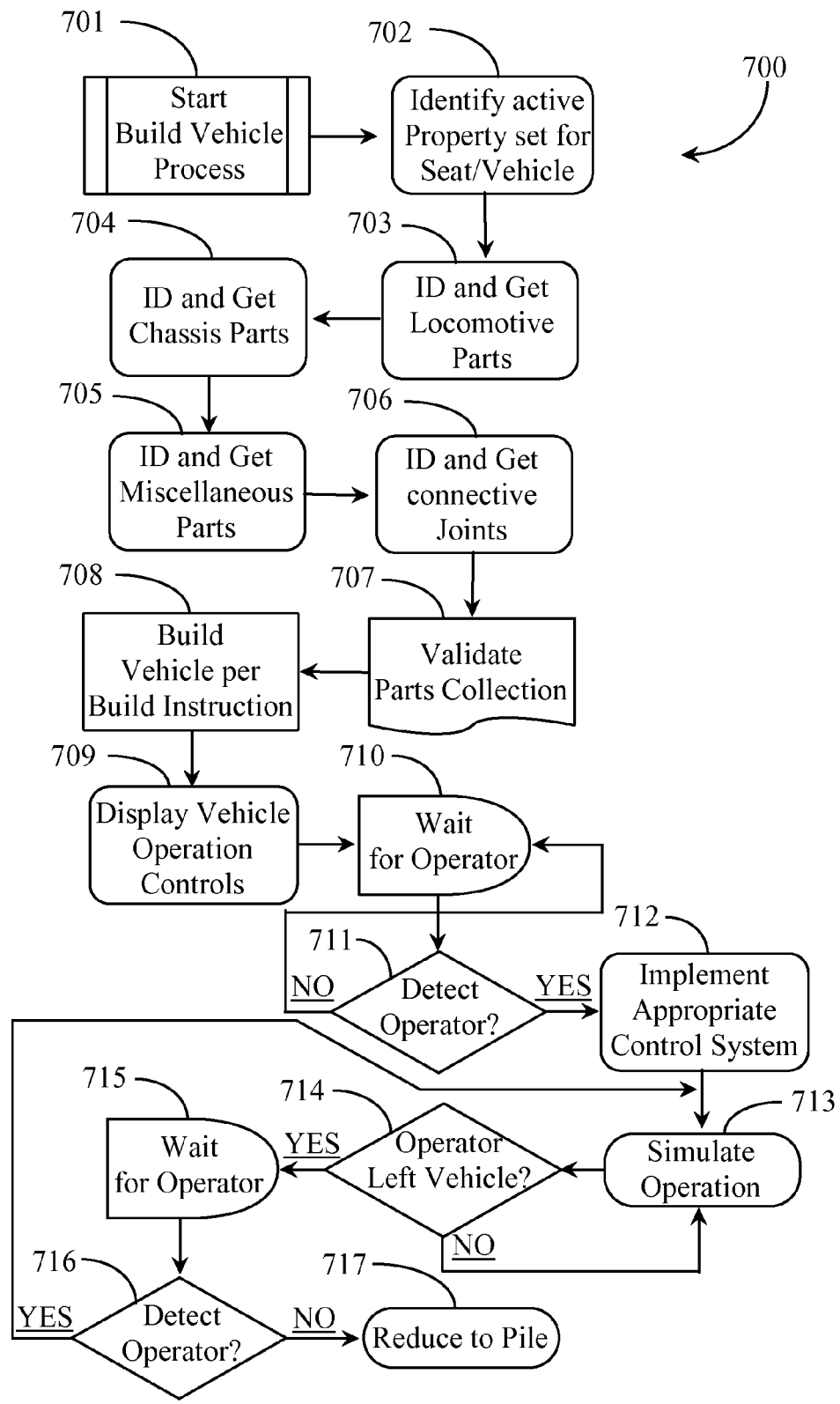
FIG. 7 is a process flow chart 700 illustrating more granular steps for building and operating a three-dimensional vehicle according to an embodiment of the present invention.

FIG. 7 is a process flow chart 700 illustrating more granular steps for building and operating a three-dimensional vehicle according to an embodiment of the present invention. At step 701a user represented by an avatar may begin or start a vehicle build process at step 701 while playing or otherwise engaging in a three-dimensional virtual world or game accessed over a network such as an Internet network.

At step 702, an algorithm identifies an active property set for a specific seat or for a specific vehicle type. In one embodiment the algorithm is initiated when a seat is attached to a parts pile representing one or more than one vehicle type. The seat may carry one set of vehicle properties (invokes the build of a single vehicle type) or more than one vehicle property set (invokes the build of a vehicle matching an active property set). In one embodiment a pile of vehicle parts is representative of a specific vehicle having a finite set of identifiable parts and matching one set of properties belonging to the seat. In this case, one seat may be able to activate automatic creation of a number of different vehicle types where parts in the pre-constructed parts pile can be matched to a property set belonging to the seat. The action of installing or associating the seat to the parts pile may initiate automated creation of the vehicle.

In one embodiment there are as many different types of seats as there are different types of vehicles known to the system. In this case a parts pile might be benign or not indicative of the actual vehicle type. However, the seat might contain all of the properties and parts identification of a specific vehicle known to the system. A vehicle known to the system will be one that has been created and tested and one whose operational properties are known to the system.

In this example, it is assumed that a seat provides the trigger event that initiates a vehicle build process. In one embodiment a vehicle token having all of the properties of a vehicle might be associated with a parts pile or a make vehicle command may be issued after selecting a pile of vehicle parts. In one embodiment a vehicle build process fueled by algorithm is capable of looking at the vehicle parts and selection the appropriate parts for a specific vehicle type. At step 703, the algorithm identifies and retrieves the locomotive parts of the vehicle. In such a case the vehicle parts may have identifiable shape properties like having a round shape useable as a wheel, a cylindrical shape useable as an axle, and so on. Joints may also be identified as those that permit locomotion such as a rotational joint. Likewise, certain locomotive parts like propellers, jet engines, etc. might be identified.

At step 704 the system may identify and retrieve the chassis parts for the specific vehicle type. Chassis parts may include doors, fenders, frames, trunks, and so on. At step 705 the system may identify and retrieve any other miscellaneous parts that make up part of the specific vehicle. At step 706 the system may identify and retrieve connective joints for connection specific vehicle parts together to form a complete vehicle. Joints might include spring joints, rotational joints, weld joints, and so on. After all of the vehicle parts are identified and retrieved for assembly, the system may validate all of the parts in the parts pile or collection at step 707.

At step 708 the system builds the vehicle in automated manner for the ordering user or avatar using a known build instruction specific to the vehicle using the validated parts. In this step the vehicle may take shape in the virtual world in real time as the user (represented by avatar) witnesses the evolution from the parts pile to a drivable vehicle object. At step 709 the system may display a set of vehicle operating instructions and controls to the ordering user through a pop-up instructional window or some other visual display mechanism. At this point the vehicle is in an operable state.

At step 710 the system waits for an operator (avatar) to begin operating the vehicle. At step 711 the system determines if the avatar has begun operating the vehicle. If the system does not detect an operator the process may loop back to step 710 to wait. If the system detects the operator at step 711, the system implements the appropriate vehicle control system for enabling key press or controller operation of the vehicle during game play. All of the vehicle capabilities and forces exerted on the vehicle are physically simulated at step 713 such as with a rigid dynamics simulation engine similar to engine 111 of FIG. 1 above.

At step 714 the system may make an attempt to detect if an operator has left the vehicle. If the avatar has not disembarked the vehicle at step 714, then the process may loop back to step 713 and continued operation is simulated. When the avatar leaves the vehicle at step 714, the system may wait for a specific period of time for the operator or avatar to resume operation of the vehicle at step 715. A specific period of time to wait at step 715 may be enforced after which the vehicle could become or be rendered unavailable to the avatar unless it is to be re-built. In one embodiment the abandoned vehicle may automatically be reverted back to a pile of vehicle parts after an operator abandons or no longer operates the vehicle.

At step 716 the system determines if the operator is back in control of the vehicle. If the operator returns within the specified time window, the process may loop back to step 713 where physics simulation of vehicle operation continues. If at step 716 the system determines that the operator did not return to the vehicle within a certain time, then the system may automatically deactivate the vehicle and reduce the vehicle back into its original state as a parts pile. In one embodiment of the present invention, the process of chart 700 may occur before a user enters a virtual game or virtual world as a preparation step for the user to select and build at least one vehicle to use when playing the game or negotiating the terrain in the virtual world.

It will be apparent to one with skill in the art that the vehicle build system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A game system, comprising:
   a computerized appliance coupled to a machine-readable, non-transitory physical medium;
   software stored on and executing from the machine-readable physical medium;
   an interactive interface provided by the software and accessible to a client, enabling the client to participate in a video game managed by the software, the video game comprising:
   an avatar associated with the client;
   a jumbled association of parts of a specific vehicle represented in a scene in the video game; and
   one or more trigger devices available to the client, individual trigger devices associated with different specific vehicles;
   wherein applying a trigger device from the one or more devices to the association of parts, if the device is associated with that specific vehicle, causes the parts to rearrange in the interactive interface into a recognizable vehicle operable by the avatar manipulated by the client.

2. The game system of claim 1 wherein the software executes on a server connected to the Internet network, and the client accesses the interactive interface from a second computerized alliance also connected to the Internet network.

3. The game system of claim 1 wherein the trigger device is a specific command provided by the client through an input mechanism.

4. The game system of claim 1 wherein the trigger device is a token displayed in the scene and movable by the client by manipulating the avatar.

5. The game system of claim 1 wherein the scene includes landscape elements, and a type of specific vehicle for an association of parts may be suggested by a type of landscape element proximate the association of parts.

6. The game system of claim 5 wherein the landscape element is a body of water, and the specific vehicle is a boat.

7. The game system of claim 5 wherein the specific type of vehicle is one of a boat, a hovercraft, an airplane, an automobile, a truck, a motorcycle, a bicycle, a scooter, a unicycle, a train, or an animal that may be mounted and ridden.

8. The game system of claim 4 wherein the token is an identifiable part associated with the specific type of vehicle of the association of parts.

9. The game system of claim 8 wherein the identifiable part is a seat for the vehicle.

10. The game system of claim 1 wherein the rearrangement of parts into a recognizable vehicle is accompanied by a display of instructions for operating the vehicle.

11. A method for providing a vehicle for an avatar in a game system, the method comprising the steps of:
   (a) presenting to a client in a scene of a video game in an interactive interface provided by software stored on and executing from a machine-readable, non-transitory physical medium on a computerized appliance, a jumbled association of parts of a specific vehicle, the interactive interface enabling the client to manipulate an avatar associated with the client;
   (b) initiating by the client a trigger device in the interactive interface, from a plurality of trigger devices each associated with a different specific vehicle; and
   (c) causing, by the initiation of the trigger device, the association of parts to resolve in the scene into a recognizable vehicle operable by the client in the interface through the avatar.

12. The method of claim 11 wherein the software executes on a server connected to the Internet network, and the client accesses the interactive interface from a second computerized alliance also connected to the Internet network.

13. The method of claim 11 wherein the trigger device is a specific command provided by the client through an input mechanism.

14. The method of claim 11 wherein the trigger device is a token displayed in the scene and movable by the client by manipulating the avatar.

15. The method of claim 11 wherein the scene includes landscape elements, and a type of specific vehicle for an association of parts may be suggested by a type of landscape element proximate the association of parts.

16. The method of claim 15 wherein the landscape element is a body of water, and the specific vehicle is a boat.

17. The method of claim 15 wherein the specific type of vehicle is one of a boat, a hovercraft, an airplane, an automobile, a truck, a motorcycle, a bicycle, a scooter, a unicycle, a train, or an animal that may be mounted and ridden.

18. The method of claim 14 wherein the token is an identifiable part associated with the specific type of vehicle of the association of parts.

19. The method of claim 18 wherein the identifiable part is a seat for the vehicle.

20. The method of claim 11 wherein the rearrangement of parts into a recognizable vehicle is accompanied by a display of instructions for operating the vehicle.

* * * * *